July 5, 1938.   S. W. BORDEN   2,122,549
EARTH ELECTRODE METER
Filed Nov. 2, 1936

Inventor
Stephen W. Borden

Patented July 5, 1938

2,122,549

UNITED STATES PATENT OFFICE 2,122,549

EARTH ELECTRODE METER

Stephen W. Borden, Summit, N. J.

Application November 2, 1936, Serial No. 108,819

7 Claims. (Cl. 175—183)

This invention relates to improvements in electrical measuring instruments and more particularly to that class of instruments which are used for measuring the resistance value of the surrounding earth through which a current must travel in passing from an earth electrode into and through the adjacent earth to the earth generally.

More particularly it is a modification of the meter described in United States Patent No. 1,820,214, the object of the modification being to provide a meter with which a current return electrode of relatively greater resistance value may be used than is feasible with the earlier type of meter. A further object is to provide a protective resistance and a protective fuse for protecting the windings of the meter against damage from foreign currents originating on the earth electrodes and other objects as they may appear hereinafter.

The meter herein described is basically the same in principle as that described in United States Patent No. 1,820,214. It is not necessary herein to demonstrate the basic theory upon which it operates, but the modifications involved and the effect they have upon the operation of the meter are hereinafter set forth.

Figure 1:
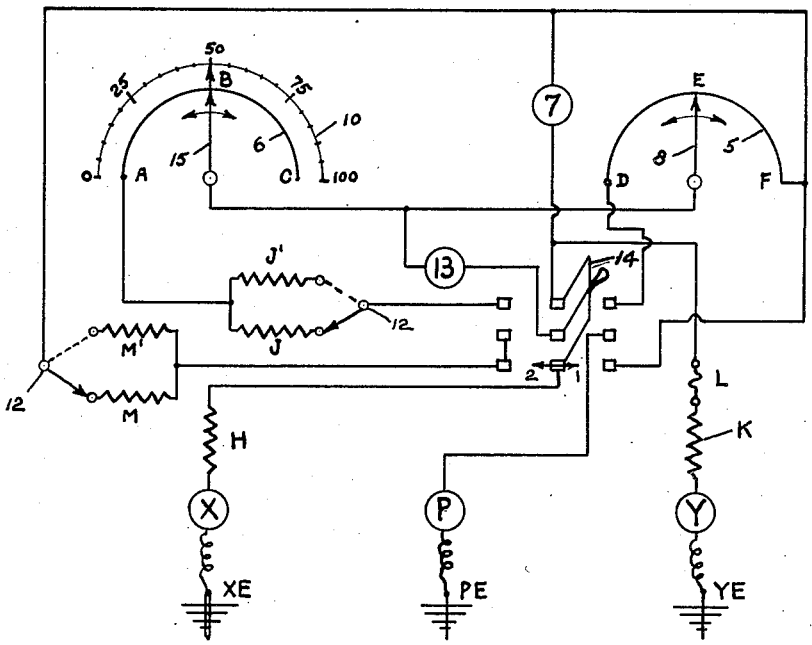
Figure 2:
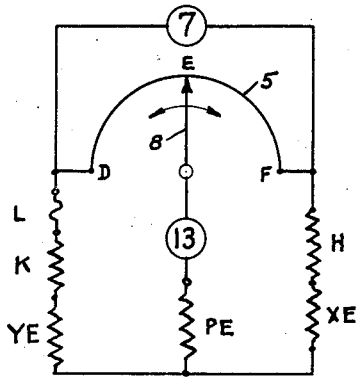
Figure 3:
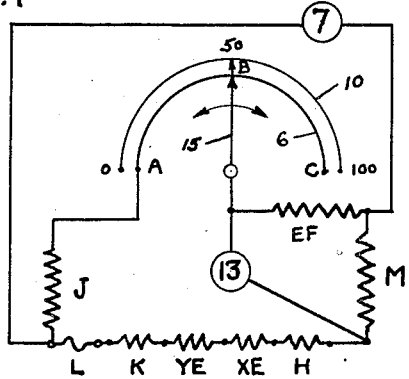

The drawing is schematic only and is intended to show the component parts and the arrangements (electrically) with respect to each other. Fig. 1 shows the arrangement of the parts for a complete meter. Fig. 2 is a simplified diagram of the connections when the switch 14 is thrown to the right or position 1 and Fig. 3 is a similar diagram when the switch is thrown to the left or to position 2.

Like symbols indicate like parts in the present drawing and also, to a considerable extent, like parts of the drawing in United States Patent No. 1,820,214.

Referring to Fig. 1. 7 represents a source of current for operating the meter; 5 and 6 are variable resistance rheostats; 13 represents a null detector; X, P and Y are binding posts from which connecting leads may be run to earth electrodes as XE, PE and YE. 14 is a three-pole double-throw switch, 10 is a scale associated with rheostat 6; M and M′, J and J′ are fixed resistances of definite values and 12 is a double-pole double-throw switch for selecting either of the resistances M or M′ and a corresponding resistance J or J′. H is a fixed resistance which is equal to J times M divided by DEF. K is a fixed resistance which may have a value in the neighborhood of 100 ohms. L represents a fuse having appreciable resistance, usually less than an ohm.

Rheostat 6 consists of a winding ABC over which a sliding contact is carried by arm 15 which arm also carries a pointer over the scale 10.

While, for the purposes of discussion, 7 and 13 are referred to as the source of current and the null indicator, respectively, it is to be understood that they may be taken and referred to as the null indicator and the source of current, respectively, as fully as would be the case were the figures duplicated with these reference characters transposed.

In the preferred form of my meter, rheostats 5 and 6 have equal resistance values and they may be 100 ohms each and scale 10 has 100 equal scale divisions marked from 0 to 100. Resistance M is 100 ohms and M′ 1,000 ohms. Resistances J and H are 100 ohms each and J′ is 10 ohms. The resistance of fuse L may be taken as 1 ohm. Resistance K may be anything from about 25 ohms to two or three hundred ohms. For this particular meter I prefer to use approximately 100 ohms.

The purpose of the meter is to measure the resistance of the earth electrode XE, that is, the electrical resistance of the circuit through which a current must travel in passing from binding post X into the general body of the earth as more fully explained in United States Patent No. 1,820,214. In order to determine this resistance it is necessary to provide two reference electrodes as YE and PE which electrodes usually are placed at least 50 feet apart and at least 50 feet from XE.

Since the meter is in the nature of a Wheatstone bridge it is understood by those skilled in the art that the source of current 7 and the null detector 13 may be transposed without changing the principle of operation.

The operation of the meter is as follows. The electrode XE, whose resistance is to be measured, is connected to binding post X and reference electrodes, as YE and PE, are driven into the ground and connected to binding posts Y and P respectively. Switch 14 is thrown to position 1, which results in forming a Wheatstone bridge as shown in Fig. 2. Arm 8 is now adjusted until indicator 13 registers zero when the following relationship will be established, namely, $$\frac{DEF}{EF} = \frac{L+K+YE+XE+H}{XE+H} \quad (1)$$

Correspondingly, $$(XE+H)DEF = (L+K+YE+XE+H)EF \quad (2)$$

Now, without disturbing the setting of arm 8, switch 14 is thrown to position 2 and, if switch 12 is in the M position, a bridge arrangement results as shown in Fig. 3. Arm 15 is now adjusted until the bridge is balanced as shown by indicator 13 when the following relationship will have been established, namely, $$\frac{AB+J}{L+K+YE+XE+H} = \frac{EF}{M} \quad (3)$$

Correspondingly, $$M(AB+J) = (L+K+YE+XE+H)EF \quad (4)$$

and from 2 and 4

$$M(AB+J) = DEF(XE+H) \quad (5)$$

Correspondingly, $$\frac{ABM}{DEF} + \frac{JM}{DEF} = XE + H \quad (6)$$

But from the specification page 2, line 3, $$\frac{JM}{DEF} = H \quad (7)$$

Therefore $$\frac{ABM}{DEF} + H = XE + H \quad (8)$$

Correspondingly, $$ABM = XE(DEF) \quad (9)$$

Correspondingly, $$AB\left(\frac{M}{DEF}\right) = XE \quad (10)$$

And $$\frac{M}{DEF}$$

is the multiplier applicable to AB.

The multiplier applicable to scale 10 is equal to $$\frac{ABC}{\text{full scale}} \times \frac{M}{DEF}$$

from which it follows that if M is to be equal to the full scale value of scale 10, which may be desirable for commercial reasons, then ABC must be equal to DEF.

It will be seen that the values of resistances K and L are theoretically immaterial as is that of YE and the objects to be gained by adding the resistance K and fuse L, as well as resistance H, will be later explained.

It will be seen that resistance J is in series with rheostat 6 and that it is connected to the end corresponding to the zero reading on scale 10. Now, if the bridge is in balance when J+AB equals H+XE it is obvious that when J equals H, AB will be equal to XE and that the value of XE will be indicated on the scale.

If the switch 12 is thrown so as to select resistance M and J and if rheostats 5 and 6 have equal resistance, regardless of the magnitude, then if M is 100 ohms and scale 10 is calibrated from 0 to 100 ohms the scale will be direct reading with respect to electrode XE. If H is to equal J then M must equal DEF. If however, switch 12 should be thrown to select resistances M' and J' and if M' be 1,000 ohms then the reading on scale 10 must be multiplied by 10 or in other words, the resistance AB+J' must be but one tenth of the resistance XE+H and therefore the resistance J' must be one tenth that of J.

The meter and its operations is fundamentally the same as that of United States Patent No. 1,820,214, the essential modifications consisting of the fixed resistance H in series with the XE electrode and the corresponding resistance J which is necessarily added when H is added.

Fuse L is added for the protection of the windings of the meter should excessive current flow therethrough due to a foreign potenial on the earth electrodes. The resistance K has a threefold use. Firstly, it acts to restrict any flow of current due to foreign potential on the electrodes; secondly, it restricts excessive current drain on the source 7 should the resistance of electrodes PE and YE be relatively low as for instance fractional ohm and thirdly, it assists under certain conditions in obtaining a more accurate balance.

Let us assume by way of explanation of the usefulness of resistance K that the electrode XE has a value of 1,000 ohms and that for testing purposes a city water main is used as reference electrode YE and that the resistance of this water main is, say, 1 ohm. Under these conditions when the first balance is obtained as in Fig. 2 we would have in one arm of the bridge XE+H or 1,100 ohms and in the other arm of the bridge YE+K+L or, say, 102 ohms, but if K be omitted we have only 2 ohms and this means that the rheostat 5 must be adjusted so that DE is to EF as 2 is to 1,100. Rheostat 5 consists of a resistance winding made up of a multiplicity of turns and each turn can be contacted at only one point and as the arm 8 approaches the end of the rheostat one turn more or less constitutes a relatively large percentage of the resistance in one arm of the bridge and for that reason a very close adjustment is not possible near the extreme ends of the rheostat. If now we insert the resistance K a balance is obtained when DE is to EF as 102 is to 1,100 which brings the point of adjustment far enough back on the rheostat DEF so that one turn more or less gives a close enough adjustment. Resistance K and the fuse L are desirable additions but not essential to the operation of the meter.

In order to understand the usefulness of resistance H let us assume that the resistance of the electrode XE is 1 ohm. In order to obtain a satisfactory balance on rheostat DEF it is desirable for the reasons stated in preceding paragraph, that the ratio between DE and EF should be not more than 20 to 1 and this means that when XE is only 1 ohm YE should not be more than 20 ohms. Now, YE is only a temporary electrode installed for the purpose of measuring XE and it is obviously desirable that there should be little or no expense to making this installation. However, an electrode of only 20 ohms resistance might be not only very expensive but almost impossible to obtain in relatively high resistance soil and even if such a value were easily obtained it would still be necessary to get along without the use of resistance K since to all intents and purposes K becomes a part of the electrode YE. If now, we make H, say, 100 ohms then we are actually measuring XE+100 ohms or 101 ohms and the resistance of YE+K may be as high as 2,000 ohms without exceeding the 20 to 1 ratio and if K is 100 ohms then YE may be 1,900 ohms.

While I have shown and described one embodiment of my invention in accordance with the patent statutes it will be understood that my invention is capable of embodiment in a variety of forms of apparatus and that I am not limited to the specific arrangement or structural parts shown and described, but that the scope of invention is to be gauged by the accompanying claims taken in connection with the state of the prior art.

What I claim is:—

1. A bridge for measuring the resistance of an earth electrode which includes four bridge arms as A, B, C and D; A containing a rheostat having a movable contact and a fixed resistance in series; B containing a rheostat, having a movable contact; C containing a known resistance and D containing two binding posts and a fixed resistance; a source of electric potential connected between the junction of arms A and D and the junction of arms B and C and a null detector connected between the junction of arms A and B and the junction of arms C and D; a graduated scale associated with the rheostat in the arm A and a double-throw switch so connected that when thrown in one direction the connections of the bridge are as stated above and when thrown in the other direction the rheostat of arm B will have its two ends connected to the two binding posts, for connection to earth electrodes, each via a fixed resistance, the source of electrical potential will be connected to the two ends of the rheostat and the null detector will be connected between the movable contact of the rheostat and a third binding post for connection to a reference electrode.

2. A bridge according to claim 1 characterized by the transposition of the source of potential and the null detector.

3. A bridge for measuring the resistance of an earth electrode which includes four bridge arms, as A, B, C, and D; A containing a rheostat having a movable contact and a fixed resistance in series; B containing a rheostat having a movable contact; C containing a known resistance; and D containing two binding posts, for connection to earth electrodes, and a fixed resistance; a source of electric potential connected between the junction of arms A and D and the junction of arms B and C and a null detector connected between the junction of arms A and B and the junction of arms C and D; a double throw switch so connected that when thrown in one direction the connections of the bridge are as stated above and when thrown in the other direction the rheostat of arm B will have one end connected to one of the binding posts and the other end connected to the other binding post via a fixed resistance, the source of electric potential will be connected to the two ends of the rheostat and the null detector will be connected between the movable contact of the rheostat and a third binding post for connection to a reference electrode.

4. A meter according to claim 3 characterized by the addition of a scale and pointer for the rheostat of bridge arm A.

5. A meter in accordance with claim 3 characterized by the fact that the resistance M is a multiplicity of resistances as M and M' and the resistance J is a multiplicity of resistances as J and J' all associated with means for connecting any one of resistances M—M' in circuit and concurrently connecting a corresponding one of resistances J—J' in circuit.

6. A meter according to claim 3 characterized by the addition of a multiplicity of resistances M—M' and a multiplicity of resistances J—J' with means for selecting any one of the said resistances M—M' and a corresponding resistance J—J' and the addition of a fixed resistance in series with electrode Y.

7. A meter according to claim 3 characterized by the transposition of the source of current and the null detector.

STEPHEN W. BORDEN.